E. B. MEAD.
SAFETY DEVICE FOR BRAKE ADJUSTMENT.
APPLICATION FILED JUNE 7, 1920.
1,373,197.
Patented Mar. 29, 1921.
2 SHEETS—SHEET 1.
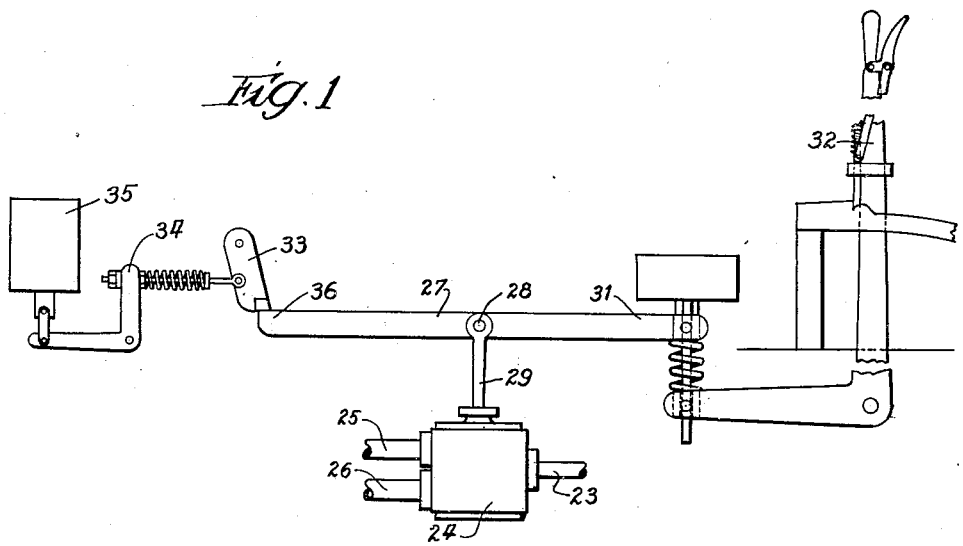
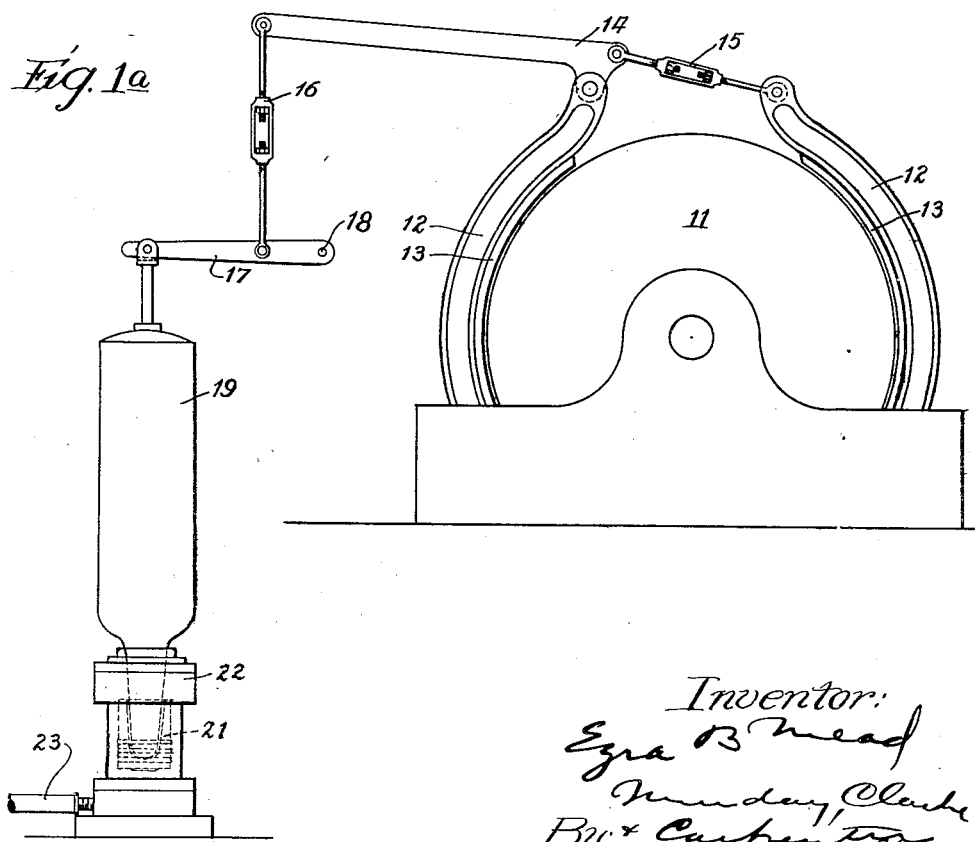
Inventor:
Ezra B Mead
By Munday Clarke
& Carpenter
Attys.

E. B. MEAD.
SAFETY DEVICE FOR BRAKE ADJUSTMENT.
APPLICATION FILED JUNE 7, 1920.
1,373,197.  Patented Mar. 29, 1921.
2 SHEETS—SHEET 2.
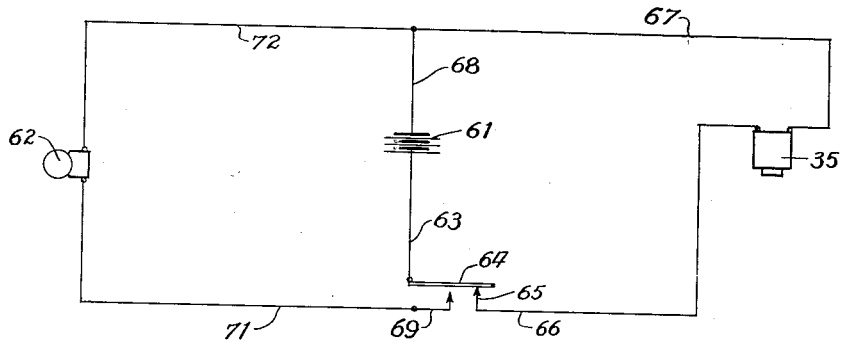
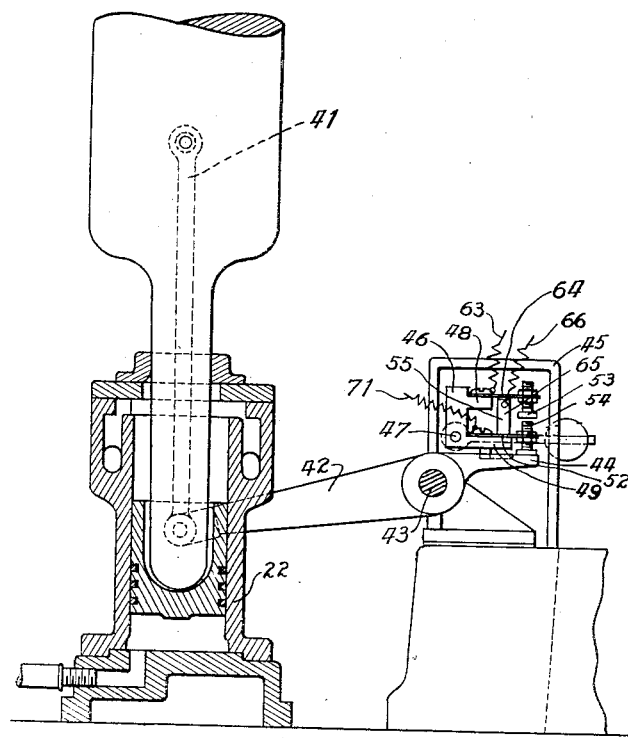

UNITED STATES PATENT OFFICE.

EZRA B. MEAD, OF OTTUMWA, IOWA, ASSIGNOR TO OTTUMWA IRON WORKS, OF OTTUMWA, IOWA, A CORPORATION OF IOWA.

SAFETY DEVICE FOR BRAKE ADJUSTMENT.

1,373,197.

Specification of Letters Patent.    Patented Mar. 29, 1921.

Application filed June 7, 1920. Serial No. 386,982.

*To all whom it may concern:*

Be it known that I, EZRA B. MEAD, a citizen of the United States, residing in Ottumwa, in the county of Wapello and State of Iowa, have invented a new and useful Improvement in Safety Devices for Brake Adjustment, of which the following is a specification.

This invention relates in general to safety devices for brakes and while the present invention has more particular reference to brakes controlled by fluid pressure systems it will be manifest that it has other and valuable application in brakes otherwise controlled and operated. The present invention has a valuable application in connection with fluid pressure controlled systems for brakes for mine hoists and the like, and this form of apparatus is herein selected for the purposes of illustration.

A principal object of the invention is the provision of means for indicating the desirability of readjustment of the brakes occasioned by wear of the brake shoes or other conditions which may render the operative movement of the control members insufficient to provide safe braking conditions. As the brake shoes or blocks wear the movement of the brake control is correspondingly increased and not infrequently brake operators set or adjust the brakes so that they will provide a wide range of movement of the control before the brake shoes or blocks are worn appreciably, so that sometimes relatively slight wear renders the brake inoperative within the range of movement of its control. My present invention contemplates the provision of indicating means such as a bell adapted to be rung when the movement of the brake control exceeds safe predetermined limits, or the provision of a device for causing emergency application of the brakes under such condition or both.

The preferred form of the safety device includes a bell rung upon slight excess of movement beyond the safe limits and devices for producing emergency application of the brakes if the ringing of the bell is unheeded, and adjustment made, although, of course, either the bell ringing device or the emergency device may be used separately if desired without sacrificing all of the advantages of the invention.

A further object of the invention is the provision of an arrangement of the character described, which will be without effect upon the normal operation of the brake and brake control, and which will require no appreciable changes in the braking systems of which it forms a part.

Still another object of the invention is the provision of a device of this character, which may be readily installed and which will not add appreciably to the cost of the apparatus.

Numerous other objects and advantages of the invention will be apparent as it is better understood from the following description, which taken in connection with the accompanying drawings discloses a preferred embodiment thereof.

Referring to the drawing:

Figures 1 and 1ª are diagrammatic or schematic views of an oil brake operating control system, in which my present invention is embodied;

Fig. 2 is an enlarged detail view of the same, the thrust cylinder being shown in section; and Fig. 3 is a diagrammatic view of the wiring.

For the purpose of illustrating my invention I have shown on the drawing in Figs. 1 and 1ª a complete diagrammatic view of a brake of the character employed in mine hoists and its control. This brake comprises a brake drum 11 and pivoted brake shoe carriers 12 provided with brake shoes 13. One of said brake shoe carriers 12 is pivoted to a bent lever 14 connected by an adjustable turnbuckle 15 with the other brake shoe carrier 12. The lever 14 is connected by a link 16 with the weight lever 17 pivoted at 18 and connected to the weight 19. This weight 19 is provided at its lower end with a piston 21 within the thrust cylinder 22 of the oil control system. This thrust cylinder receives oil from a suitable source of pressure through a pipe line 23 communicating with a valve 24 to which is connected a pipe 25 leading to an accumulator or other source of oil under pressure. The valve 24 is so constructed that when in one position communication is established from the pipe 23 and the thrust cylinder permitting the pressure in the system to raise the weight and relieve the brake, and when in a second position, i. e. an upper position, permitting establishment of communication with an outlet pipe 26 leading to the sump and permitting the pressure to exhaust and the brake weight 19 to apply the brakes.

The valve 24 is controlled in the present instance by a lever 27 pivoted at 28 to the valve stem 29 and having one arm 31 adapted to be controlled in any suitable fashion by manually operable brake applying lever 32. As this lever is moved back and forth the valve is shifted to release and apply the brakes in the manner generally already described. The other end of the lever is held in the present instance by a latch 33 connected with a bell crank 34 normally held in position by a solenoid 35 to maintain the latch over the end 36 of the lever. The valve 24 is so constructed that when the end of the lever 36 is released it permits the pressure in the system to lift the valve and establish communication between the pipes 23 and 25. The internal arrangement of this valve is not believed to need particular description in this application since it is fully described in my co-pending application Serial No. 364,338, and this entire arrangement is selected merely for the purposes of illustration, it being readily understood that without appreciable change it may be embodied in apparatus of other form. As the brake shoes or blocks 13 wear in service it will be manifest that the weight 26 will have longer travel and I have provided in the present instance means for ringing the bell when this length of travel needs adjustment of the brake shoes, i. e. when the travel of the brake shoes and movement of the brake into applying position approaches the end of control movement or exceeds a safe limit.

Upon the side of the weight in the present instance I provide a rod 41 attached to one arm 42 of a lever pivoted at 43 alongside the thrust cylinder 22. The other arm of this lever 44 extends into a housing 45 in which is pivoted a frame 46 at 47. This frame is provided with two arms 48 and 49 arranged in parallelism and one above the other, the lower arm 49 being somewhat longer than the arm 48. Upon each arm is provided a spring leaf 51 and 52 carrying set screws 53 and 54 located one above the other and adapted to be brought into contact in certain predetermined conditions as will be presently explained.

A bracket 55 is positioned upon the lower arm 49 and is normally in contact with the upper leaf 51.

The two leaf springs 51 and 52 and the bracket 55 are parts of electric circuits as will be now described. Referring to Fig. 3 reference character 61 indicates a source of electric energy and adapted to supply the current for controlling the solenoid 35 and an electric bell 62. The circuit for the solenoid 35 is normally a closed circuit and may be traced as follows: wire 63 from the source of electric energy to a contact 64 engaging a contact 65, wire 66 from contact 65 to the solenoid and wires 67 and 68 back to the source 61. The circuit for ringing the electric bell comprises wire 63 terminal 64 normally out of contact with the terminal 69, wire 71 to the bell and wires 72 and 68 back to the source.

Referring now to Fig. 2 the leaf 51 and set screw 53 together constitute contact 64. Bracket 55 constitutes contact 65, and leaf 52 and set screw 54 constitute contact 69. The solenoid circuit is normally closed as has been stated. This is accomplished by engagement with the bracket 55 with the leaf 51 and the circuit bell which is normally open between the set screws 53 and 54. When, however, the movement of the piston 21 downwardly in the cylinder is in excess of the movement it should have when the brake members are moving within safe limits its arm 64 lifts the set screw 54 bringing it into contact with the set screw 53 and ringing the bell, thus indicating to the operator the need of adjusting his brakes. The bell thus rings every time the brakes are operated and continues to ring until adjustment is accomplished. Should this be neglected, however, notwithstanding the ringing of the bell, further wearing of the brake shoes causes a still further descent of the piston 21 and still further upward movement of the lever arm 44, this movement lifting the set screw 53 and the leaf 51 away from the bracket 55. The separation of these contacts interrupts the circuits of the solenoid 35 with the result that the latch 33 is pulled off the end of the lever by the dropping of the armature, and emergency setting of the brakes results.

It will be manifest that either the bell ringing devices or the solenoid devices may be omitted or be out of repair and action without interfering with the warning of the operator by the other devices of the need of readjusting his brakes, which adjustment in the present control consists merely of tightening of the turn-buckle, unless, of course, the brake shoes be wholly worn out, in which case new shoes will be required.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A safety device for brakes, comprising a brake control and means movable to an operative position when the brake control nears the end of its operative movement in applying the brakes for indicating the need of brake adjustment.

2. A safety device for brakes, comprising means for applying the brake, and means inoperative when the braking parts are moving within safe limits of travel and rendered operative by movement in excess thereof for indicating need of brake adjustment.

3. A safety device for brakes, comprising means for applying the brake, and means inoperative when the braking parts are moving within safe limits of travel and rendered operative by movement in excess thereof for applying the brakes and preventing operation thereof until readjustment of the brakes.

4. A safety device for brakes, comprising means for applying the brake, and means inoperative when the braking parts are moving within safe limits of travel and rendered operative by movement in excess thereof for indicating need of brake adjustment, said last mentioned including a bell.

5. A safety device for brakes, comprising means for applying the brake, an electric circuit including a bell and having separable contacts, and means controlling the position of said contacts and disturbing their normal arrangement with the resulting ringing of the bell when the brake applying means moves beyond safe limits of travel.

6. A safety device for brakes, comprising brake applying means, an electric circuit including an emergency solenoid for actuating said applying means and engageable contacts, and means disturbing the normal contact arrangement with resulting actuation of said solenoid when the movement of the brake applying means exceeds safe limits.

7. A safety device for brakes, comprising a thrust cylinder having a piston movable in accordance with the brake movement, an electric circuit including a bell, and means movable with the piston in said cylinder for disturbing circuit conditions with resultant ringing of the bell when said piston moves an amount indicating excess of movement of the brake beyond safe limits.

8. A safety device for brakes, comprising a brake applying member, bell ringing devices connected to said member and movable into arrangement to produce ringing of the bell when the brake applying member moves as the result of excessive movement of the brake beyond safe limits.

9. A safety device for brakes, comprising a thrust cylinder having a piston movable in accordance with the brake movement, and brake applying devices movable with said piston to apply the brakes when the brakes have worn beyond safe limits.

10. A safety device for brakes, comprising a brake applying member, and devices movable with said brake applying member and causing said brake member to apply the brakes when the brake shoes have worn beyond safe limits.

11. A safety device for brakes, comprising a brake applying member, and means movable with the brake applying member and including a bell ringing upon movement of the brake applying member beyond safe limits and including also means for causing said brake applying member to apply the brakes upon further movement of said brake applying member beyond the movement producing ringing of the bell.

12. A safety device for brakes, comprising a brake applying means, electric circuits including respectively a bell and a brake solenoid, and means for arranging said circuit to produce first ringing of the bell upon movement of the brake applying member beyond safe limits and subsequently actuation of the solenoid upon movement beyond the movement causing ringing of the bell.

13. A safety device for brakes, comprising a manually operable brake control, an emergency control member, and means actuating said emergency control member to apply the brakes when the brakes under the manually controlled member exceed safe limits of movement.

14. A safety device for brakes, comprising manual and emergency control members, said emergency control member including a solenoid and an electric circuit closed by movement of the brake in excess of safe limit for operating said solenoid to produce emergency application of the brakes.

15. A safety device for brakes, comprising a manual control for normal operation of the brakes, and an emergency control operable upon excessive movement of the brakes under action of the manual control and beyond safe limits, and a bell ringing device operable in advance of the emergency brake control and as a result of movement of the brakes beyond safe limits and within said excess required for the actuation of the emergency brake control.

16. A safety device for brakes, comprising a fluid pressure system including a thrust cylinder for controlling the brakes, and manually operable and emergency valves, a device movable in accordance with the extent of brake movement for producing actuation of the emergency valve to apply the brake when the brake movement exceeds safe limits.

17. A safety device for brakes, comprising a fluid pressure system for controlling the brake, including a thrust cylinder, a manually operable valve, and a bell ringing device rendered operable by movement of the brakes in excess of safe limits for indicating need of adjustment.

18. A safety device for brakes, comprising a fluid pressure control including a thrust cylinder, and manually operable and emergency valves, and devices including bell ringing members and operable upon excessive movement of the brake beyond safe limit to first ring the bell and then actuate the emergency valve to apply the brake.

19. A safety device for brakes, comprising a fluid pressure system, including a thrust cylinder manually operable, and emergency valves, a solenoid for controlling the emergency valve, an electric circuit for controlling said solenoid, and a device movable with the brake for actuating said solenoid upon excessive movement thereof beyond safe limits to cause said emergency valve to apply the brake.

20. A safety device for brakes, comprising a fluid pressure system, including a thrust cylinder, and manually operable and emergency valves, a solenoid for controlling the emergency valve, a bell, and means movable with the brake for ringing the bell for excessive movement of the brake beyond the limit and for subsequently actuating the solenoid to apply the brake upon movement beyond the movement producing ringing of the bell.

EZRA B. MEAD.